Alfred Boettcher
INVENTOR.

United States Patent Office 3,354,043
Patented Nov. 21, 1967

3,354,043
FUEL ELEMENT FOR NUCLEAR REACTORS
Alfred Boettcher, Aachen, Germany, assignor to Kernforschungsanlage des Landes Nordrhein-Westfalen-e.V., Julich, Germany, a corporation of Germany
Filed Jan. 3, 1966, Ser. No. 518,072
Claims priority, application Germany, Jan. 13, 1965, K 55,003
3 Claims. (Cl. 176—72)

ABSTRACT OF THE DISCLOSURE

A fuel element for a high temperature, liquid cooled nuclear reactor having a carburizable-metal shell made of steel, a steel alloy, zirconium or a zirconium alloy. Within the shell is a core of fissionable (e.g. uranium carbide) or breeder material, a filler material which comprises a low melting metal (e.g. metallic sodium, mercury, potassium, bismuth, lead, and amalgam of mercury, sodium, potassium and their alloys) filling the space between the core and the shell, and zirconium foil or zirconium particles imbedded in the low melting metal for limiting carburization of the shell.

Figure 1:
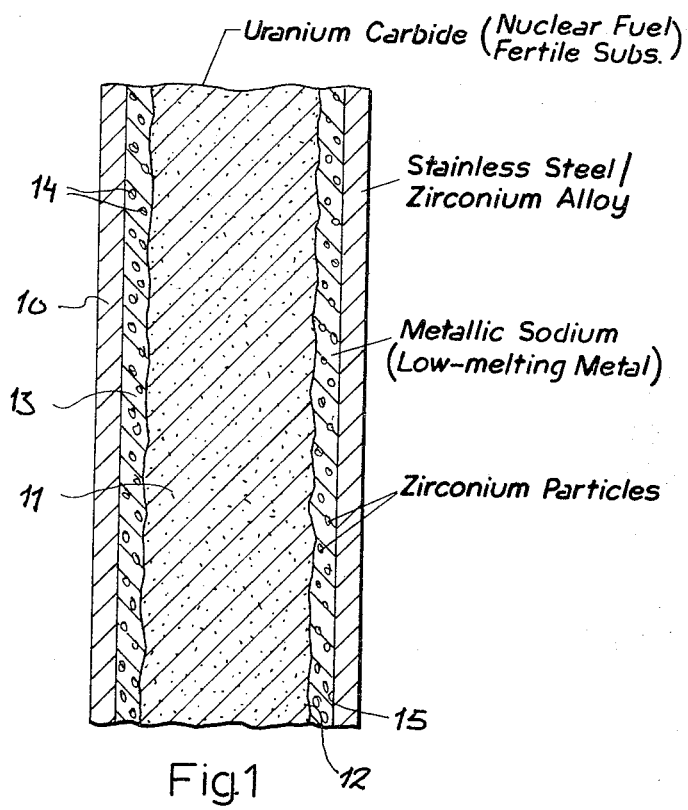

My present invention relates to a fuel element for nuclear reactors and, more particularly, to a jacketed or encased fuel element of the rod or slug type containing a core of a fissionable and/or breeder (i.e. fertile) material in a steel or zirconium-alloy shell.

The use of rod-like and other fuel elements in which a fissionable material is enclosed within a jacket, sleeve or shell of a corrosion-resistant metal is common in many varieties of nuclear reactors and indeed the greater majority of nuclear reactors in common use are provided with replaceable fuel elements of this character. In my copending application Ser. No. 498,786 filed Oct. 20, 1965, and entitled, "Fuel Element for Liquid-Cooled Nuclear Reactors," I describe a particularly advantageous configuration and construction of a fuel element. The casing or shell of fuel elements of this latter type as well as of conventional fuel elements protect the fuel from the corrosive influences of a coolant medium and serve as containers for the fission fragments and reaction products of the fuel which must be prevented from contaminating the coolant. The characteristics of the metal serving both as a corrosion-resistant heat transfer medium between the fuel within the coolant without and as a partition preventing entry of the coolant into the interior of the fuel element and escape of the radioactive substances into the coolant from the interior of the fuel element are determined by these requirements and the ability of the metal to resist the elevated temperatures present in the reactor core. Furthermore, the metal sleeve must be resistant to any reaction with the coolant and the contents of the fuel element and whatever reaction may occur must be confined to a minimum of effect upon the partition walls over the period of use of the fuel element. In practice, it has been found that stainless steels for use as fuel-element shells, are in fact attacked from within by the fuel or other fissionable substance especially when the latter includes a carbide of a fissionable element. This attack, which is characteristic especially of fuel elements using uranium carbide as the fissionable substance, is especially noticed when the fuel element is used in reactors whose coolants generally have an operating temperature between 500° and 700° C. in the reactor core. Most reactors of this latter type are metal-cooled systems using liquid sodium, potassium, mercury and bismuth coolants which include these metals alone or in alloys or mixtures of them. Reactors cooled by organic media (e.g. diphenol, terphenyl) also are included within this general class of high-temperature liquid-cooled reactors. The reactors generally make use of uranium-carbide fuels and steel or zirconium-alloy shells and have been found to be disadvantageously characterized by the development of gaps, crevices and clearances between the fissionable material and the surrounding shell. Such gaps whose development appears in conventional systems to be unavoidable at the elevated temperature of such reactors, sharply reduce the efficiency of heat transfer between the fissionable material and the thermally conductive shell. Efforts to solve this problem with the aid of low-melting packings or fillers in the gap have proved to be incompletely effective as a consequence of the fact that the elevated temperatures and nuclear irradiation of the fuel elements appear to result in a release of carbon from the uranium-carbide fuel and a diffusion of the carbon through the filler to the wall of the shell which is thereby carburized. Such carburization renders the shell fragile and prone to rupture with the danger that manipulation of the fuel element will cause a spontaneous release of radioactive material.

It is, therefore, the principal object of the present invention to provide a fuel element for nuclear reactors in which this last-mentioned disadvantage can be avoided and whereby deterioration of the metallic shell of the fuel element surrounding a carbide-containing fissionable substance can be prevented.

Another object of this invention is to provide an improved metal-encased uranium-carbide fuel element with a high coefficient of thermal transfer from the fuel substance to the surrounding coolant.

Still another object of this invention is to provide a fuel element for a nuclear reactor in which the metal casing thereof does not deteriorate by carburization from within.

These objects and others which will become apparent hereinafter are attained, in accordance with the present invention, in a fuel element comprising a fissionable substance (generally a carbide) and metallic carburizable shell, which includes a low-melting metal interposed in the gaps formed between the fissionable substance and the surrounding shell so as to insure uninterrupted thermal conduction from the fuel to the shell, and a body of zirconium-containing metal in the filler of low-melting metal for preferential and preventative carburization, I have discovered, in accordance with the feature of the invention, that the presence of a mass of zirconium or zirconium alloy in the low-melting metal filling the gaps between the fuel and the sleeve or shell of the fuel element will substantially completely prevent carburization of the shell wall at elevated temperatures within the ranges usually encountered in liquid metal or organic-current reactors (500° C. to 700° C.) as well as temperatures above this range, presumably because of the consumption of any carbon diffusing through the low-melting metal filler by the zirconium or zirconium-alloy mass. The latter may be constituted as particles of zirconium or zirconium alloy dispersed in the low-melting-point metal (preferably sodium) or as a foil or sheet of zirconium alloy and zirconium metal embedded in the low-melting metal. It has been found that the life of a fuel element of the character described can be improved by this technique to the extent that theoretically desirable levels of fuel burnout can be attained without requiring premature removal of the fuel element from the reactor in the belief that carburating deterioration of the shell wall has reached a danger level. The liquid metal can be liquid sodium, as indicated, although liquid potassium, mercury, alloys of sodium, potassium and mercury and other low-melting-point metals can be used for the purposes of the present invention.

Suitable zirconium alloys for my purposes include those mentioned in my copending application above.

Figure 2:
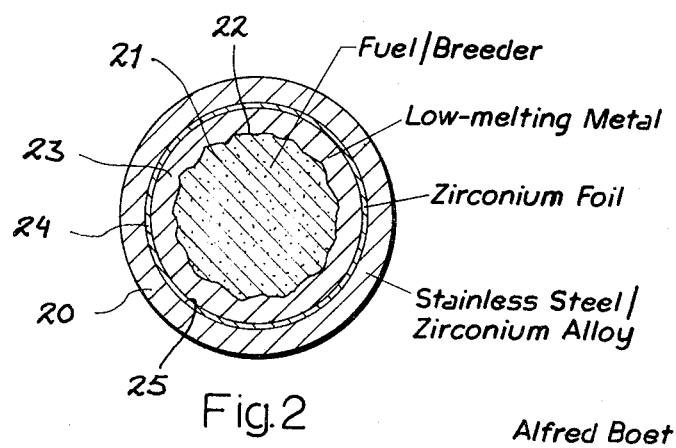

The above and other objects, features and advantages of the present invention will become more readily apparent from the following description, reference being made to the accompanying drawing in which:

FIG. 1 is an axial cross-sectional view through a rod-like fuel element according to the invention; and FIG. 2 is a transverse cross-sectional view through another fuel element.

In FIG. 1 of the drawing, I show a stainless steel or zirconium-alloy shell 10 containing a uranium-carbide core 11 of fissionable material. The gap 12 between the fissionable mass 11 and the shell 10 contains a filler 13 of low-melting metal (e.g. sodium, potassium, lead, bismuth) in which are dispersed particles 14 of zirconium or zirconium alloy. At temperatures between 500° and 700° C., the zirconium particles 14 appear to prevent any carburization of the inner wall 15 of the shell 10. In FIG. 2, the shell 20 forms a gap 22 with the fuel core 21 and the filler mass 23 of low-melting metal serves to embed a thin foil 24 of zirconium or zirconium alloy between the mass 21 of fuel and the shell 20. Again carburization of the inner wall 25 of the shell 20 is obviated.

The invention described and illustrated is believed to admit of many modifications within the ability of persons skilled in the art, all such modifications being considered within the spirit and scope of the appended claims.

I claim:
1. A fuel element for a nuclear reactor comprising:
   a carburizable-metal shell composed of steel, zirconium or a zirconium alloy;
   a mass of a carbon-containing fissionable material of a fissionable-element carbide within said shell;
   a metallic filler of a low-melting metal selected from the group consisting of sodium, potassium, mercury, bismuth, lead and amalgams and alloys thereof disposed between said mass of fissionable material and said shell; and
   at least one metallic body of zirconium-containing metal imbedded in said filler for limiting carburization of said shell.

2. A fuel element as defined in claim 1 wherein said fissionable material is uranium carbide and said zirconium-containing metal is dispersed in said filler as particles of zirconium or a zirconium alloy.

3. A fuel element as defined in claim 1 wherein said fissionable material is uranium carbide and said zirconium-containing metal is constituted as a foil surrounding said fissionable material and disposed between said fissionable material and said shell in said filler.

References Cited
UNITED STATES PATENTS

| | | | |
|---|---|---|---|
| 3,085,059 | 4/1963 | Burnham | 176—82 X |
| 3,098,024 | 7/1963 | Barney et al. | 176—82 |
| 3,108,936 | 10/1963 | Gale | 176—91 X |
| 3,168,399 | 2/1965 | Takahashi et al. | 176—91 X |
| 3,170,847 | 2/1965 | Dudek et al. | 176—71 |
| 3,212,988 | 10/1965 | Ringot | 176—71 X |

CARL D. QUARFORTH, *Primary Examiner.*

BENJAMIN R. PADGETT, *Examiner.*

M. J. SCOLNICK, *Assistant Examiner.*